(12) United States Patent
Panetti et al.

(10) Patent No.: US 12,129,056 B2
(45) Date of Patent: Oct. 29, 2024

(54) SYSTEM FOR THE RELEASE OF SATELLITES FROM A LAUNCH VEHICLE

(71) Applicant: Thales Alenia Space Italia S.p.A. Con Unico Socio, Rome (IT)

(72) Inventors: Aniceto Panetti, Rome (IT); Andrea Marchetti, Rome (IT); Alberto Ritorto, Rome (IT); Andrea Adriani, Rome (IT); Luigi Scialanga, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 0 days.

(21) Appl. No.: 17/916,179

(22) PCT Filed: May 26, 2021

(86) PCT No.: PCT/IB2021/054601
§ 371 (c)(1),
(2) Date: Sep. 30, 2022

(87) PCT Pub. No.: WO2021/240404
PCT Pub. Date: Dec. 2, 2021

(65) Prior Publication Data
US 2023/0141538 A1    May 11, 2023

(30) Foreign Application Priority Data

May 26, 2020  (IT) .................. 102020000012415

(51) Int. Cl.
*B64G 1/64* (2006.01)
(52) U.S. Cl.
CPC ............. *B64G 1/645* (2013.01); *B64G 1/641* (2013.01)
(58) Field of Classification Search
CPC .......... B64G 1/645; B64G 1/641; B64G 4/00; B64G 1/1078; B64G 1/64;
(Continued)

(56) References Cited

U.S. PATENT DOCUMENTS 4,600,355 A * 7/1986 Johnson ............... B25J 9/08
414/730
5,145,130 A * 9/1992 Purves ............... B64G 1/646
901/1

(Continued)

FOREIGN PATENT DOCUMENTS

JP    2011-251560 A    12/2011
WO    WO 87/02006 A1    4/1987

OTHER PUBLICATIONS

PCT International Search Report and Written Opinion dated Aug. 31, 2021 for PCT Application No. PCT/IB2021/054601.

*Primary Examiner* — Medhat Badawi
*Assistant Examiner* — Vicente Rodriguez
(74) *Attorney, Agent, or Firm* — McCarter & English, LLP

(57) ABSTRACT

A release system for the release of satellites from a launch vehicle is provided that includes: (i) a torsion bar, having a first end which is fixed by means of support means to a launch vehicle and is locked in rotation around a longitudinal axis of the torsion bar, and a second end which is connected by means of hinge means to the launch vehicle and is free to rotate around the longitudinal axis; (ii) at least one launch arm extending perpendicularly from the torsion bar and comprising (a) a torsion lever having a first end which is fixed to the torsion bar in an integral manner, and (b) a guide having a first end connected to a second end of the torsion lever, and a second free end; (iii) at least one slider which is fixed in an integral manner to a satellite to be launched and arranged to engage the guide in a sliding manner; and (iv) and a limit stop element designed to act upon the torsion lever to stop the rotation of the launch arm around the longitudinal axis.

6 Claims, 2 Drawing Sheets

(58) Field of Classification Search
CPC ...... B64G 2004/005; B64G 1/247; B25J 5/00; B25J 11/00; B25J 5/06; B25J 9/06; B25J 9/08; B25J 9/1679
See application file for complete search history.

(56) References Cited

U.S. PATENT DOCUMENTS

| | | | |
|---|---|---|---|
| 7,114,682 B1 * | 10/2006 | Kistler | B64G 1/40 |
| | | | 244/172.5 |
| 9,434,485 B1 * | 9/2016 | Lehocki | B64G 1/402 |
| 10,538,347 B1 * | 1/2020 | Turner | B64G 1/10 |
| 11,728,592 B2 * | 8/2023 | Goff | H01R 13/631 |
| | | | 439/39 |
| 2009/0127399 A1 | 5/2009 | Mueller et al. | |
| 2012/0080563 A1 * | 4/2012 | Gryniewski | B64G 1/14 |
| | | | 244/172.5 |
| 2016/0075452 A1 | 3/2016 | Robles et al. | |
| 2017/0050317 A1 * | 2/2017 | Monreal | B25J 9/1674 |
| 2018/0170586 A1 | 6/2018 | Riskas | |

\* cited by examiner

SYSTEM FOR THE RELEASE OF SATELLITES FROM A LAUNCH VEHICLE

CROSS-REFERENCE TO RELATED APPLICATIONS

This patent application is a 35 U.S.C. § 371 National Stage filing of International Application No. PCT/IB2021/054601, filed on May 26, 2021, which application claims priority from Italian patent application no. 102020000012415 filed on May 26, 2020, the entire disclosures of which are incorporated herein by reference.

TECHNICAL FIELD

The present invention relates to a system for the release of satellites from a launch vehicle.

BACKGROUND ART

Currently, the normally used release system provides for the presence of a plurality of coil springs arranged in an integral manner with the launch vehicle and adapted to produce a thrust to eject the satellite. Such a release system involves launching the satellite along a direction which is perpendicular to the separation plane.

As may be obvious to one skilled in the art, coil springs must be selected according to the mass of the satellite to be launched, which necessarily implies the possibility of having to replace coil springs every time the mass of the satellite to be launched changes.

However, despite being commonly used, such a solution involves a number of issues.

In fact, the satellite, once launched by the action of the coil springs, is subject to a rotational movement.

Such rotational movement is mainly due to the fact that the springs can never be exactly identical to each other and, at the same time, can never elongate simultaneously with respect to each other.

The latter aspect derives from the impossibility of activating the different release elements in an exactly synchronous manner. As may be immediately apparent to one skilled in the art, even a few µs difference between the activation of the various release elements, results in an important imbalance in the overall thrust received by the satellite and, consequently, its rotation. Other elements of indeterminacy and consequent rotation of the satellite in the release step are the non-perfect knowledge of the position of its centre of mass and the transient vibrations of the launch vehicle structures.

The rotation to which the satellite is subjected after been released necessarily leads to a delay in the deployment of the solar panels and, therefore, a prolonged use of energy from the batteries within the satellite. This aspect represents a considerable element of risk, since the energy of the satellite batteries must always be available during the step which immediately follows the release and prior to the deployment of the solar panels in order to carry out "emergency" operations.

Furthermore, in case the launch vehicle carries a plurality of satellites arranged side by side, releasing the satellites along a direction perpendicular to the plane of separation may cause a risk of collision between them. In fact, it is well known that for release systems using coil spring thrust, it is appropriate to consider a directional "cone of uncertainty" of about 15° with respect to the intended release direction. Such a condition implies a lower occupation of the space available in the launch vehicle nose cone and a limitation in the number of satellites to be mounted on the same launch vehicle.

In addition to the above-mentioned issues, there is a need in the sector for a system capable of guaranteeing a release speed higher than that produced by the current systems, which use a limited number of coil springs as thrusting means. In fact, a higher release rate would result in a faster movement of the satellite away from the launch vehicle and, therefore, in the possibility to deploy the solar panels sooner. This would consequently reduce the use of battery power with the associated benefits as set forth above.

For safety reasons, the deployment of the solar panels must take place at a distance of several hundred meters from the launch vehicle and, if this distance is not reached by the thrust of the release, it will be necessary to rely on battery energy.

Finally, another need perceived in the field concerns the possibility of having a release system which can be adapted to satellites with different masses without having to replace part of the components. In other words, a need was perceived for a release system whose means of thrust would be effective regardless of the mass of the satellite. As reported above, in fact, the solution providing for the use of coil springs necessarily requires that they are selected according to the mass of the satellite to be launched.

DISCLOSURE OF INVENTION

Object of the present invention is a system for the release of satellites from a launch vehicle; said release system being characterized in that it comprises: (i) a torsion bar having a first end which is fixed to a launch vehicle by means of support means and is locked in the rotation around a longitudinal axis of the torsion bar, and a second end, which is connected to said launch vehicle by means of hinge means and is free to rotate around said longitudinal axis; (ii) at least one launch arm extending perpendicularly from said torsion bar and comprising (a) a torsion lever having a first end which is fixed to said torsion bar in an integral manner, and (b) a guide having a first end connected to a second end of said torsion lever, and a second free end; (iii) at least one slider, which is fixed to a satellite to be launched in an integral manner and is arranged so as to engage, in a sliding manner, said guide; (iv) and a limit stop element, which is designed to act upon said torsion lever to interrupt the rotation of the launch arm around the longitudinal axis.

Preferably, said first end of said guide is connected by a locking joint to said second end of said torsion lever. Thereby, by means of the locking joint, it will be possible to change the release direction according to the angle between the guide and the torsion lever.

Preferably, said guide comprises an energy absorber.

Preferably, the system comprises torsion pre-loading means acting on said first end of the torsion bar. These means set a bar starting torsion, i.e. already upstream of the loading torsion due to the rotation of the launch arm engaged by the satellite to be launched. Thereby, it will be possible to adapt the elastic force required for an effective release according to the mass of the satellite to be launched.

Preferably, the system comprises a reversible locking element which is arranged to lock the launch arm onto the limit stop element.

BRIEF DESCRIPTION OF THE DRAWINGS

Hereinafter an embodiment is reported for illustrative and non-limiting purposes with the aid of the accompanying figures, wherein.

BEST MODE FOR CARRYING OUT THE INVENTION

Figure 1:
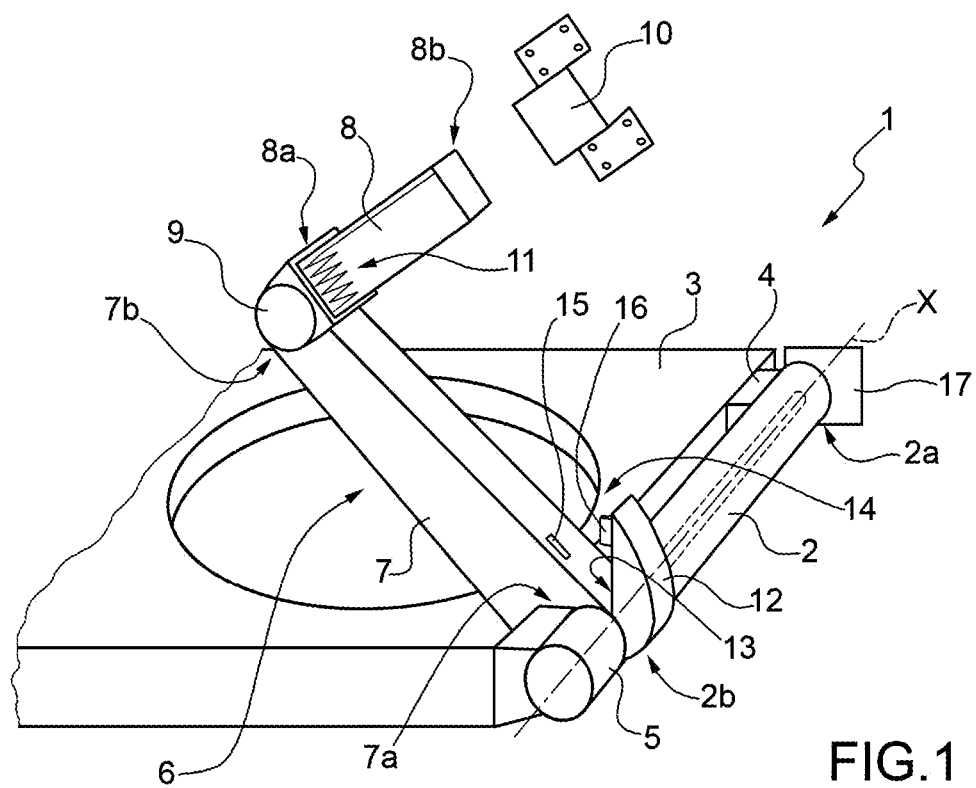
FIG. 1 is an overall perspective view of the release system of the present invention according to an embodiment.

In FIG. 1, 1 denotes as a whole the system according to a preferred embodiment of the present invention.

The system 1 comprises a torsion bar 2 fixed to a launch vehicle 3. In particular, the torsion bar 2 has a first end 2a which is fixed to the launch vehicle 3 by a support 4 and a second end 2b fixed to the launch vehicle 3 by a hinge 5. The first end 2a is locked in rotation, i.e. it cannot rotate around the longitudinal axis X of the torsion bar during the loading carried out by the rotation of a launch arm as described hereinafter. Conversely, the second end 2b is free to rotate around the X axis thanks to the hinge 5. As will be shown hereinafter, the torsion resulting from the fact that the first end 2a is locked while the second end 2b is free to rotate, obtains the elastic loading required to release the satellite.

The system 1 comprises a launch arm 6, which is the member transmitting the thrust generated by the torsion of the bar to the satellite to be launched. The launch arm 6 consists of a torsion lever 7 and a guide 8 connected to the torsion lever 7 by a locking joint 9. In particular, the torsion lever 7 has a first end 7a which is connected in an integral manner to the torsion bar 2 and a second end 7b engaged by the locking joint 9, while the guide 8 has a first end 8a engaged by the locking joint 9 and a second free end 8b.

The system 1 comprises a slider 10 which is fixed, while being used, to the satellite to be launched and arranged to slide on the guide 8, and then to leave it at its second end 8b.

The presence of the locking joint 9 enables to modify the angle between the torsion lever 7 and the guide 8 and, therefore, allows to select the release direction to be transmitted to the satellite.

The guide 8 comprises an energy absorber 11 positioned near the first end 8a thereof.

The system 1 comprises a limit stop element 12, arranged to lock the rotation of the torsion lever 7 around the axis X. In particular, the limit stop element 12 comprises a striking surface 13 against which a portion of the torsion lever 7 strikes.

The system 1 comprises a locking element 14 that ensures reversible locking of the torsion lever 7 on the limit stop element 12 once the portion of the torsion lever 7 has stricken against the striking surface 13. The locking element 14, according to a preferred embodiment, comprises a slot 15 obtained in the portion of the torsion lever 7 and a pin 16 extending from the striking surface 13. A reversible male-female locking is thereby achieved. The torsion lever 7, once it has ended its stroke due to the presence of the limit stop element 12, will be locked on the striking surface 13. Obviously, unlike what has been disclosed, it is also possible to obtain the locking element 14 by making the slot in the striking surface 13 and arranging the pin on the portion of the torsion lever 7.

Finally, the system 1 comprises a torsion pre-loading element, schematically shown and indicated by 17.

The torsion pre-loading element 17 acts on the first end 2a of the torsion bar 2 and sets a base torsion level of the bar.

In practice, the torsion pre-loading element 17 makes a rotation of the first end 2a of the torsion bar 2 and, subsequently, locks its position. Thereby, it will be possible to vary the elastic force of the torsion bar according to the mass of the satellite to be launched.

Preferably the torsion bar 2 is made of steel, as well as other components that are subjected to high mechanical stress, while the majority of the system is made of aluminum. Preferably, the slider 10 is made of a polymeric material so as to ensure a low level of friction between the slider 10 and the guide 8.

In use, after the locking joint 9 has been set, the launch arm 6 is rotated thus realizing a torsion (loading) of the torsion bar 2 until its position is locked by means of temporary locking means, which are removed before the satellite is launched, and not shown or described for simplicity. The satellite is thereby mounted by engaging the slider 10 attached thereto to the guide 8 of the launch arm 6.

Once the launch vehicle with the satellites has reached the separation conditions, it is possible to command the release of the satellite locking system to the launch vehicle (e.g. with a pyrotechnic belt tensioner system or with explosive bolts), and the consequent free rotation of the launch arm 6.

Figure 2:
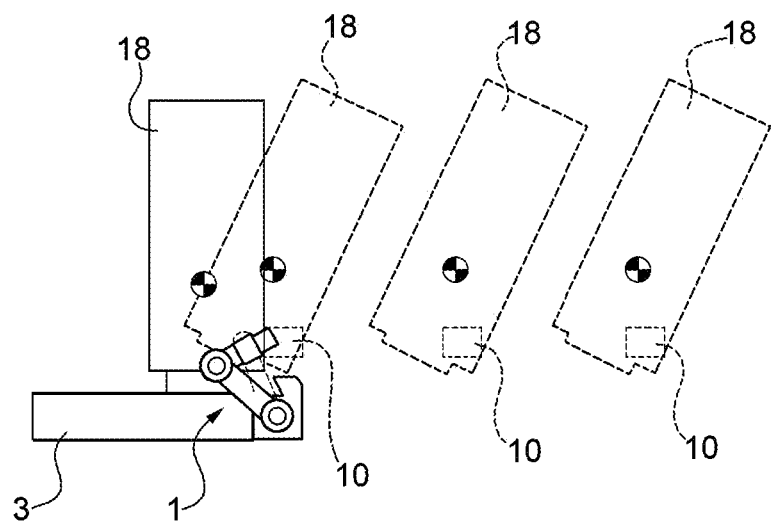
FIG. 2 shows the movement steps of a satellite which is subjected to the action of the release system according to the present invention.

As illustrated in FIG. 2, once the locking of the satellite from the launch vehicle has ceased, the torsion bar 2 forces the rotation of the launch arm 6 and the satellite 18 around the X axis until the torsion lever 7 impacts against the limit stop element 12. In the thrust step, the constraint between the guide and the slider is obtained in such a way that no other trajectory is allowed to the satellite except for the desired circular one. The movement of the satellite 18 is thereby transformed from rotational to purely translational, with the slider 10 sliding along the guide 8 and then leaving it at its second end 8b. For this purpose, the guide and the slider (prismatic constraints) are sized in such a way as to give the satellite torque pulses, on the three coordinated axes, in order to cancel all possible rotations and to obtain only the desired mere translation at the exit of the guide.

It should be noted that the release system of the present invention does not release the satellite in a direction vertical to the separation plane.

This makes it possible to mount a plurality of satellites on the launch vehicle, even very close to each other.

Figure 3:
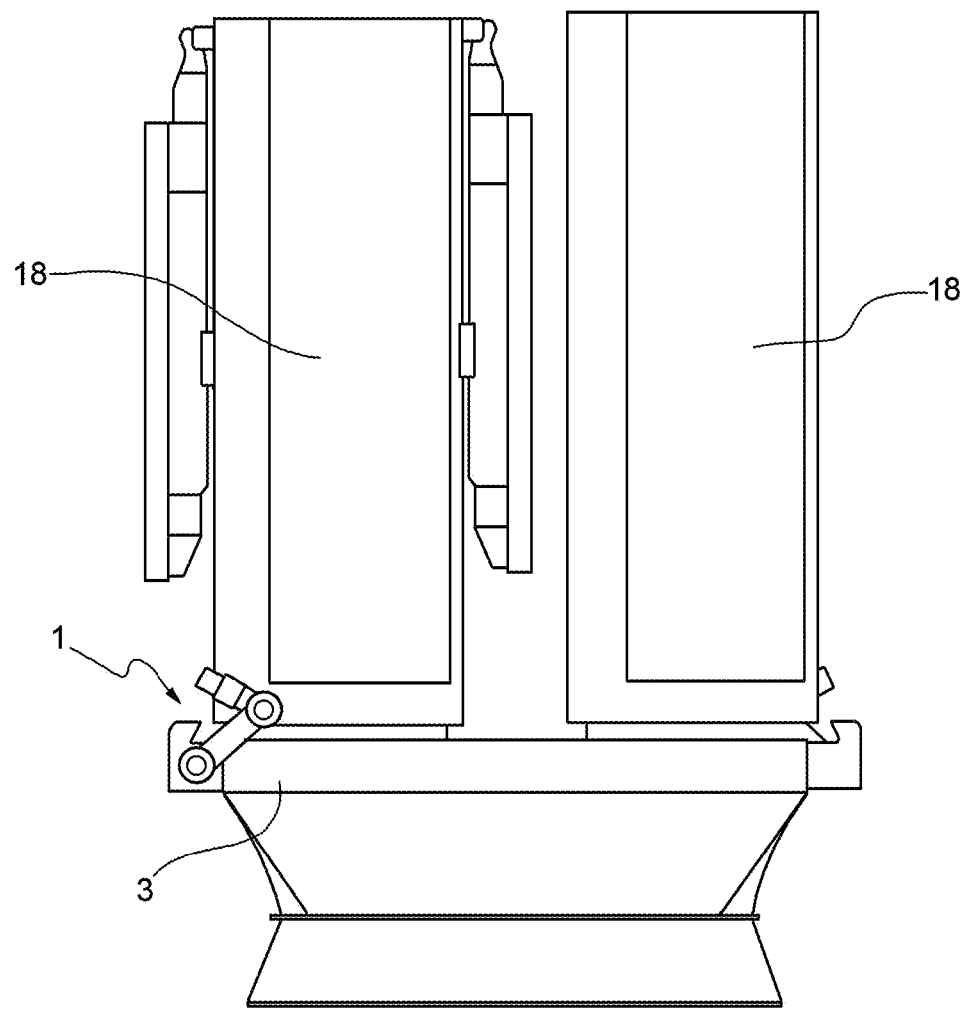
FIG. 3 shows a launch vehicle carrying two satellites to each of which a release system according to the present invention is applied.

As it can be construed from FIG. 3, the launch vehicle can accommodate two satellites and place them close to each other without the risk of them colliding during the release.

Indeed, the release system of the present invention is such that the two satellites are launched from opposite sides of the launch vehicle.

From the foregoing, it derives that the release system of the present invention, comprising a single thrust point on the satellite combined with the stabilizing effects of the prismatic guide, does not produce the rotational movement which is typical of the release systems of the known art.

The absence of rotational movement and the high release rate produced by the torsion bar make it possible to obtain the stabilization on the three satellite axes and the subsequently deployment of the solar panels sooner than with the systems of the prior art. This effect necessarily leads to the important advantage related to a lower consumption of energy from the satellite batteries with a resulting reserve energy to support possible initial emergency situations.

Moreover, the presence of the torsion pre-loading element 17 makes it possible to modify the thrust force deriving from the torsion bar according to the mass of the satellite to be launched and the desired release rate, with no need to change the components of the system.

Unlike what above disclosed, the release system of the present invention may comprise two launch arms rather than one. This variant is necessary in case the mass of the satellite is significantly high. The two launch arms, however, are connected to the same torsion bar in such a way as to prevent even the slightest asynchronous release. This solution could be implemented by means of a connecting element between a first launch arm whose end is connected to the torsion bar and a second launch arm. Such a connecting element may consist of a connecting tube arranged outside the torsion bar.

The invention claimed is:

1. A release system for release of satellites from a launch vehicle; said release system comprising:
   (i) a torsion bar having a first end, which is fixed to a launch vehicle and is incapable of rotation around a longitudinal axis of the torsion bar, and a second end, which is hingedly connected to said launch vehicle and is free to rotate around said longitudinal axis;
   (ii) at least one launch arm extending perpendicularly from said torsion bar and comprising (a) a torsion lever having a first end which is fixedly connected to said torsion bar and a second end, and (b) a guide having a first end rotatably connected to the second end of said torsion lever by a joint, and a second free end;
   (iii) at least one slider, which is fixed to a satellite to be launched and is arranged so as to engage said guide; and
   (iv) a limit stop element, which is designed to act on said torsion lever to interrupt the rotation of the launch arm around the longitudinal axis.

2. The release system for release of satellites from a launch vehicle according to claim 1, wherein the joint rotatably connecting the first end of the guide to the second end of the torsion lever enables changing an angle between said guide and said torsion lever.

3. The release system for release of satellites from a launch vehicle according to claim 2, wherein said guide comprises an energy absorber.

4. The release system for release of satellites from a launch vehicle according to claim 1, wherein the release system further comprises a torsion pre-loading element configured to rotate the first end of the torsion bar and lock in position to vary an elastic force of the torsion bar.

5. The release system for release of satellites from a launch vehicle according to claim 1, wherein said limit stop element comprises a striking surface, against which a portion of said respective launch arm strikes in order to end a stroke of the launch arm.

6. The release system for release of satellites from a launch vehicle according to claim 1, wherein the release system further comprises a reversible locking element, which is designed to lock the launch arm on the limit stop element.

* * * * *